(12) United States Patent  (10) Patent No.: US 9,050,868 B2
Schott et al.  (45) Date of Patent: Jun. 9, 2015

(54) GOOSENECK HITCH ASSEMBLY (71) Applicant: MIDWAY PRODUCTS GROUP, INC., Monroe, MI (US)

(72) Inventors: Randall T. Schott, Temperance, MI (US); Daryl Adams, Novi, MI (US); Johnny H. Allison, Plymouth, MI (US)

(73) Assignee: Midway Products Group, Inc., Monroe, MI (US)

( * ) Notice: Subject to any disclaimer, the term of this patent is extended or adjusted under 35 U.S.C. 154(b) by 0 days.

(21) Appl. No.: 14/151,243

(22) Filed: Jan. 9, 2014

(65) Prior Publication Data

US 2014/0197618 A1 Jul. 17, 2014

Related U.S. Application Data

(60) Provisional application No. 61/751,399, filed on Jan. 11, 2013.

(51) Int. Cl.
*B60D 1/06* (2006.01)

(52) U.S. Cl.
CPC ...................... *B60D 1/065* (2013.01)

(58) Field of Classification Search
CPC ........................................................ B60D 1/06
USPC ................. 280/491.1, 491.2, 491.5, 508, 511
See application file for complete search history.

(56) References Cited

U.S. PATENT DOCUMENTS

| | | | |
|---|---|---|---|
| 4,201,400 A * | 5/1980 | Hoogenbosch | 280/511 |
| 4,256,324 A | 3/1981 | Hamilton | |
| 4,570,966 A | 2/1986 | Giboney et al. | |
| 4,657,274 A | 4/1987 | Mann et al. | |
| 4,883,285 A | 11/1989 | Hohrman | |
| 4,921,266 A | 5/1990 | Beals | |
| 5,016,898 A | 5/1991 | Works et al. | |
| 5,104,138 A | 4/1992 | Allen | |
| 5,143,393 A | 9/1992 | Meyer | |
| 5,342,076 A | 8/1994 | Swindall | |
| 5,435,585 A | 7/1995 | Chambers | |
| 5,472,222 A | 12/1995 | Marcy | |
| 5,755,452 A | 5/1998 | Tambornino | |
| 5,860,671 A * | 1/1999 | Mackeown | 280/511 |
| 5,871,222 A * | 2/1999 | Webb | 280/511 |
| 5,906,387 A | 5/1999 | Wallace | |
| 5,971,418 A | 10/1999 | Lindenman et al. | |
| 6,095,545 A | 8/2000 | Bol, II et al. | |
| 6,099,015 A | 8/2000 | Marcy | |
| 6,199,890 B1 | 3/2001 | Lindenman et al. | |
| 6,409,202 B1 * | 6/2002 | Putnam | 280/495 |
| 6,447,000 B1 | 9/2002 | Dick et al. | |
| 6,467,793 B2 | 10/2002 | Putnam | |
| 6,520,528 B2 | 2/2003 | Fandrich et al. | |
| 6,533,308 B1 | 3/2003 | Tambornino | |
| 6,616,168 B2 * | 9/2003 | Belinky | 280/511 |

(Continued)

*Primary Examiner* — Joseph Rocca
*Assistant Examiner* — Felicia L Brittman
(74) *Attorney, Agent, or Firm* — Barnes & Thornburg LLP (57) ABSTRACT

A hitch assembly having a ball stud assembly and a sleeve with an open end dimensioned to receive the ball stud assembly. The ball stud assembly including a ball portion and a locking assembly. The ball stud assembly is movable between an extended position in which the ball portion extends out of the sleeve and a retracted position in which the ball portion is fully received within the sleeve. The locking assembly is configured to selectively lock the ball stud assembly with respect to the sleeve in either the extended position or the retracted position.

19 Claims, 10 Drawing Sheets

(56) References Cited

U.S. PATENT DOCUMENTS

| | | |
|---|---|---|
| 6,695,338 B1 | 2/2004 | Roberts |
| 6,837,511 B1 | 1/2005 | Johnson, III |
| 6,969,090 B1 | 11/2005 | Works |
| 7,168,727 B2 | 1/2007 | Dick |
| 7,775,545 B2 | 8/2010 | Dick |
| 7,793,968 B1 | 9/2010 | Withers |
| 7,918,476 B1 | 4/2011 | Linger |
| 8,011,685 B2 | 9/2011 | Belinky et al. |
| 2004/0160037 A1 | 8/2004 | Dick |
| 2004/0239074 A1 | 12/2004 | Lindenman et al. |
| 2006/0087100 A1 | 4/2006 | Gurtler |
| 2007/0108729 A1 | 5/2007 | Dick |
| 2009/0224511 A1 | 9/2009 | Dick |

* cited by examiner

GOOSENECK HITCH ASSEMBLY

RELATED APPLICATIONS

This application claims the benefit of U.S. Provisional Application Ser. No. 61/751,399, filed Jan. 11, 2013, entitled "Gooseneck Hitch Assembly" which is hereby incorporated by reference in its entirety.

TECHNICAL FIELD

The present invention relates generally to hitches for towing; in particular, the invention relates to a gooseneck hitch assembly that may be moved to multiple positions for use and storage.

BACKGROUND AND SUMMARY

Unlike other types of hitches that mount below a vehicle's rear bumper, gooseneck trailer hitches are often mounted in the bed of pickup trucks. In a typical "gooseneck" trailer hitch assembly, the ball is mounted on the floor of the pick-up bed to the truck frame below the bed over the rear axle of the truck. In this arrangement, the trailer has a long tongue portion which is curved and takes on the shape of a goose's neck. The benefit of having the hitch ball mounted directly over the trailer, instead of being mounted on the bumper, is that the amount of load placed on the tongue of the trailer can be increased as the load is passed directly onto the rear axle of the truck instead of onto the bumper.

Although "gooseneck" hitches have been around for years, one issue that arises is the mounting location in the middle of the truck bed which limits the use of the truck bed for other purposes. This arrangement causes a problem because the only storage area is around the hitch assembly which causes large flat sheets to be stored vertically. The gooseneck assembly is in the way for loose materials, such as gravel, and will get covered with dirt and grime.

In one aspect, the invention provides a hitch assembly that is movable between multiple positions. For example, the hitch assembly may include a ball stud assembly with a ball portion and a stud portion. A sleeve could be included that is dimensioned to receive the ball stud assembly. In some embodiments, the ball stud assembly may move between an extended position, a retracted position, and a stowed position. In the extended position, the ball portion of the ball stud assembly is elevated above the truck bed in a position for towing. In the retracted position, the ball portion is lowered beneath the truck bed, so as to not be an obstacle to loading the bed. The stowed position allows the ball stud assembly to be placed in an inverted position where the ball stud assembly is below the truck bed.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Figure 1:
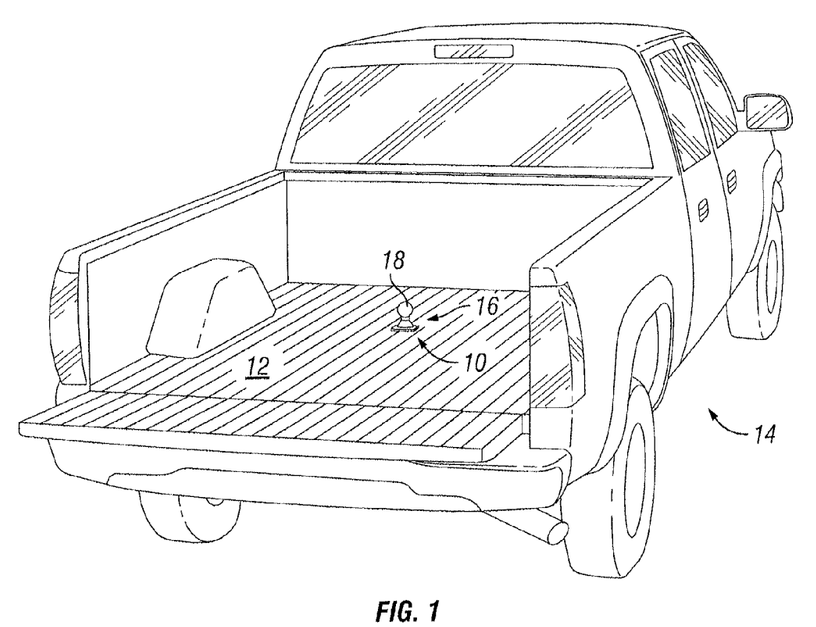
FIG. 1 is a rear perspective view of an example truck with a hitch assembly according to an embodiment of the invention.

FIG. 1 shows example hitch assembly 10 mounted in a bed 12 of a vehicle, such as a pickup truck 14. Although a pickup truck is shown in FIG. 1 for purposes of example, one skilled in the art should appreciate that the hitch assembly 10 may be mounted in other vehicles. The hitch assembly 10 includes a ball stud assembly 16 with a ball portion 18 that extends through the bed 12 of the truck 14 in its extended position. This could be coupled with a trailer, etc. As discussed below, the ball stud assembly 16 is movable between an extended position (FIG. 1) in which the ball portion 18 extends through the truck bed 12 and a retracted position in which the ball portion 18 is retracted below the truck bed 12 (FIG. 22). In some embodiments, the ball stud assembly 16 may be flipped over and moved to a stowed position in which the ball stud assembly 16 is in an inverted position.

Figure 2:
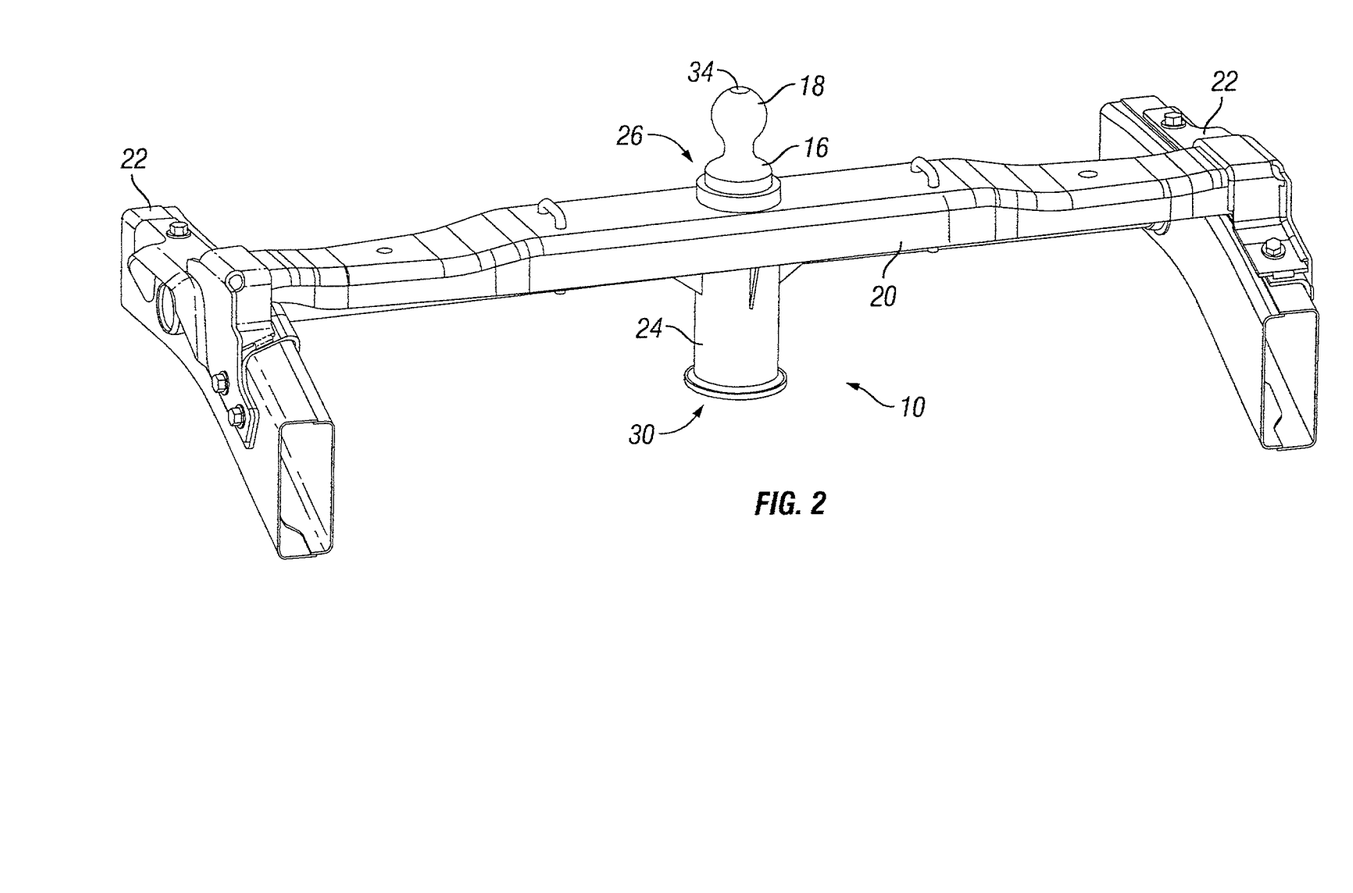
FIG. 2 is a front perspective view of a portion of the example truck frame with a hitch assembly according to an embodiment of the invention.

FIG. 2 shows a portion of the truck frame with a cross member 20 that extends transversely across the chassis 22. In the embodiment shown, the hitch assembly 10 includes a sleeve 24 that is mounted to the frame rail 20, such as by welding. The sleeve 24 has a top end 26 with an opening 28 (FIG. 3) that is accessible through the truck bed 12 and a bottom end 30 extending downwardly from the frame rail 20. The opening 28 defined in the sleeve 24 is dimensioned to receive the ball stud assembly 16. In the embodiment shown, the sleeve 24 is configured to lock the ball stud assembly 16 in either an extended, retracted, or stowed position. In the extended position, the ball portion 18 of the ball stud assembly 16 extends from the sleeve 24 through the truck bed 12. A portion of the ball stud assembly 16 is locked into place by the sleeve 24 to maintain the extended position. In the retracted position, the ball stud assembly 16 is fully received within the sleeve 24 (i.e., does not extend into the truck bed 12). When in the retracted position, a cap (FIG. 13) could be placed over the opening in the truck bed 12 to prevent debris from entering the sleeve 24. Additionally, the ball stud assembly 16 may be moved to a stowed position by pulling the ball stud assembly 16 out of the sleeve 24 and placing the ball stud assembly 16 in the sleeve 24 in an inverted position (i.e, so the bottom of the ball stud assembly 16 is generally flush with the top of the sleeve 24). The ball stud assembly 16 includes a locking assembly 32 that may be used to selectively lock the ball stud assembly 16 with the sleeve 24. In the embodiment shown, a release button 34 is provided on top of the ball portion 18 for unlocking the locking assembly 32 to release the ball stud assembly 16 from the sleeve 24 as explained further below.

Figure 3:
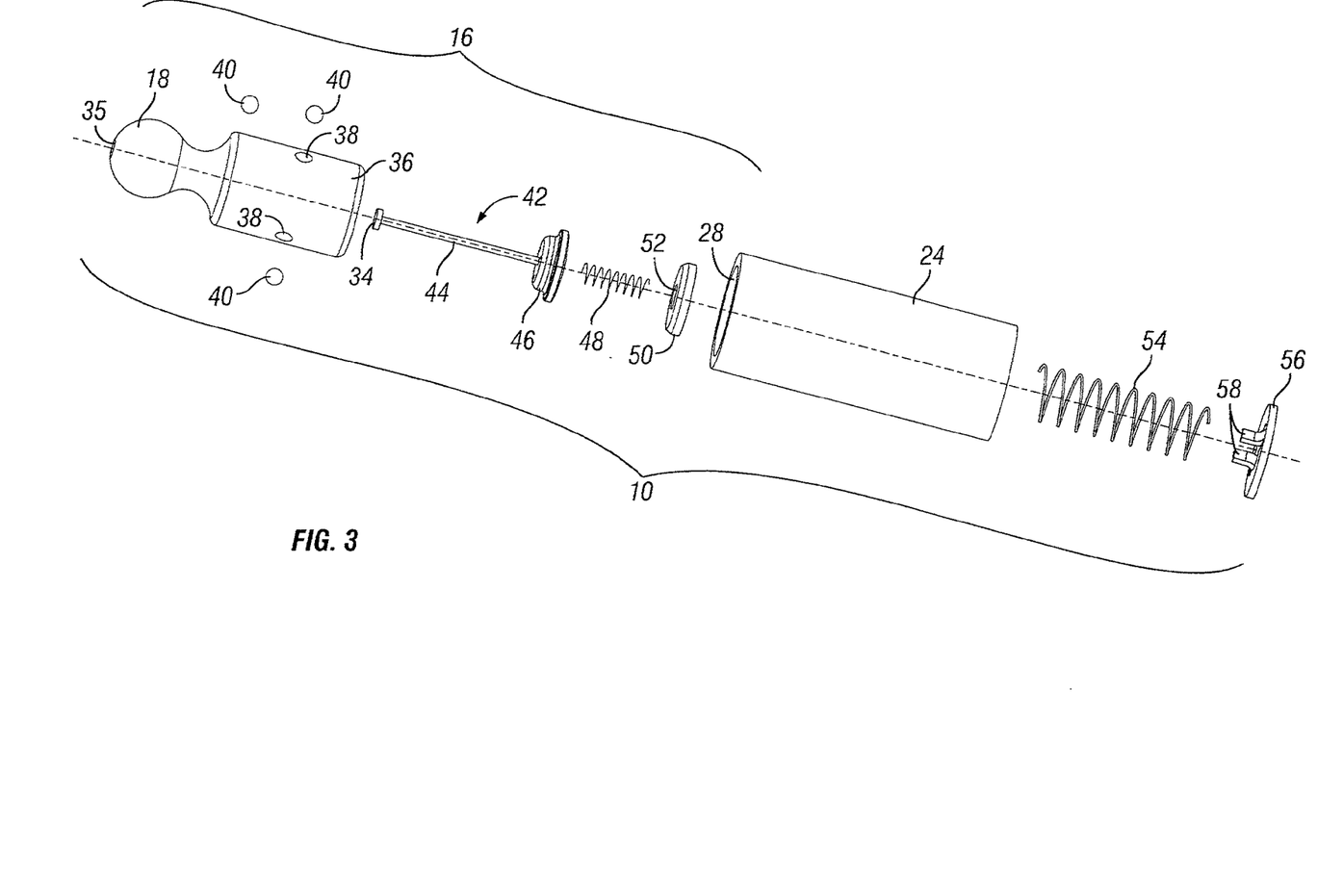
FIG. 3 is an exploded view of an example hitch assembly according to an embodiment of the invention.

FIG. 3 is an exploded view of the hitch assembly 10 according to one embodiment. As shown, the hitch assembly 10 includes a ball stud assembly 16 with a ball portion 18 configured to receive a gooseneck trailer (not shown). A cylindrical stud portion 36 extends from the ball portion 18 and is dimensioned to be received by the opening 28 in the sleeve 24. Embodiments are contemplated in which the ball portion 18 could be detachable from the stud portion 36, such as to accommodate different sizes of ball portions. In the example shown, the stud portion 36 includes openings 38 dimensioned to receive bearings 40 that act as a detent with respect to interior slots 41 (See FIGS. 19-20) in the sleeve 24 to lock the ball stud assembly 16 to the sleeve 24. Although the example shown in FIG. 3 includes three bearings, one skilled in the art should appreciate that more or less bearings could be used depending on the application.

The ball stud assembly 16 has an internal bore through which a release assembly 42 extends. In the embodiment shown, the release assembly 42 includes an elongated rod 44 with a release button 34 accessible through an opening 35 in the ball portion 18 on one end and a plunger 46 on the other end. For example, the release button 34 and/or the plunger 46 could be screwed on the ends of the rod 44 or could be fastened in other ways, such as welding, adhesive, etc. The release assembly 42 is urged toward the ball portion 18 by a biasing member 48, such as a spring, in the example shown. Due to the biasing member 48 acting on the plunger 46, the plunger 46 urges the bearings 40 outwardly to engage the interior surface of the sleeve 24, including the interior slots 41 (See FIGS. 19-20). When the bearings 40 engage the interior slots 41 of the sleeve 24, this locks the ball stud assembly 16 with the sleeve 24. In this embodiment, the user may overcome the force of the biasing member 48 by pushing on the release button 34, which allows the bearings 40 to retract within the openings 38.

A cap 50 is connected to the plunger 46 in the embodiment shown. For example, the cap 50 may include external threads that mate with interior threads in the plunger 46. As shown, the cap 50 includes a recessed portion 52 dimensioned to receive an end of the biasing member 48.

As discussed above, the sleeve 24 includes an opening 28 dimensioned to receive the ball stud assembly 16. In the embodiment shown, the ball stud assembly 16 is urged out of the top end 26 of the opening 28 by a biasing member 54. This means that the ball stud assembly 16 will be urged out of the sleeve 24 when the release button 34 is actuated to release the ball stud assembly 16 from the sleeve 24.

A base plate 56 is connected to the bottom end 30 of the sleeve 24 in the embodiment shown. For example, the base plate 56 may include external threads that mate with interior threads in the bottom end 30 of the sleeve 24. As shown, the base plate 56 includes prongs 58 dimensioned to receive an end of the biasing member 54.

Figure 4:
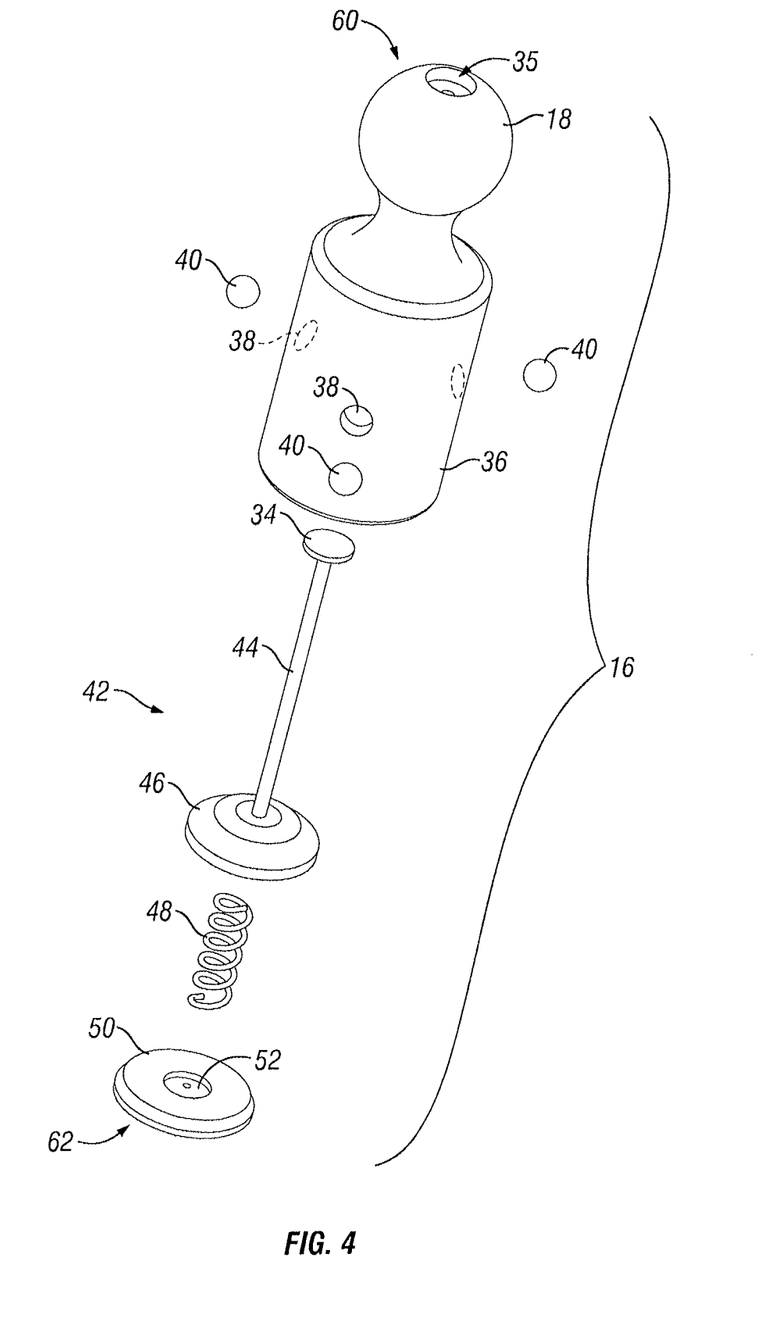
FIG. 4 is an exploded view of an example ball stud assembly according to an embodiment of the invention.

FIG. 4 is an exploded view of the ball stud assembly 16 according to the embodiment shown in FIG. 3. In the embodiment shown, the ball stud assembly 16 has a top end 60 with a ball portion 18 configured to couple with a trailer. Although the ball portion 18 has a generally spherical shape in the embodiment shown, other shapes and configuration are contemplated depending on the particular application. One skilled in the art should appreciate that the size of the ball portion 18 could vary depending on the application. A stud portion 36 extends from the ball portion 18. In the example shown, the stud portion 36 has openings 38 for receiving bearings 40. The bearings 40 act as a detent with respect to interior slots 41 (See FIGS. 19-20) in the sleeve 24 to lock the ball stud assembly 16 to the sleeve 24. Although the example shown in FIG. 3 includes three bearings 40, one skilled in the art should appreciate that more or less bearings could be used depending on the application. Embodiments are contemplated in which other types of detent or locking mechanisms could be used depending upon the application.

The ball stud assembly 16 has an internal bore through which a release assembly 42 extends. In the embodiment shown, the release assembly 42 includes a rod 44 with a release button 34 accessible through an opening 35 in the ball portion 18 on one end and a plunger 46 on the other end. The release assembly 42 is urged toward the ball portion 18 by a biasing member 48, such as a spring, in the example shown. Due to the biasing member 48 acting on the plunger 46, the plunger 46 urges the bearings 40 outwardly to engage the interior surface of the sleeve 24, including the interior slots 41. When the bearings 40 engage the interior slots 41 of the sleeve 24, this locks the ball stud assembly 16 with the sleeve 24. In this embodiment, the user may overcome the force of the biasing member 48 by pushing on the release button 34, which allows the bearings 40 to retract within the openings 38.

A cap 50 is connected to the plunger 46 on the bottom 62 of the ball stud assembly 16 in the embodiment shown. For example, the cap 50 may include external threads that mate with interior threads in the plunger 46. As shown, the cap 50 includes a recessed portion 52 dimensioned to receive an end of the biasing member 48.

Figure 5:
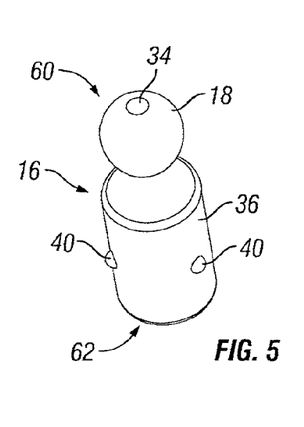
FIG. 5 is a perspective view of the example ball stud assembly shown in FIG. 4.

FIG. 5 is a perspective view of the ball stud assembly 16 according to the embodiment shown in FIG. 4. As shown, the ball stud assembly 16 includes a top end 60 with a ball portion 18. A stud portion 36 extends from the ball portion 18. The stud portion 36 has openings 38 through which bearings 40 can extend and retract to engage and disengage, respectively, the internal slots 41 in the sleeve 24 by actuation of the release button 34.

Figure 6:
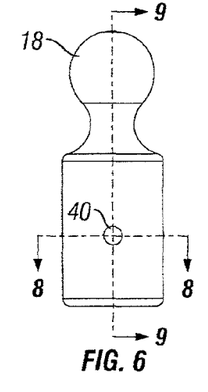
FIG. 6 is a side view of the example ball stud assembly shown in FIG. 4.

FIG. 6 is a side view of the example ball stud assembly 16. In this example, the bottom of the ball stud assembly 16 has a chamfered edge to allow easier insertion into the sleeve 24.

Figure 7:
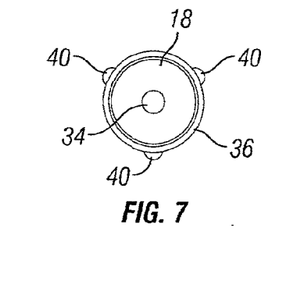
FIG. 7 is a top view of the example ball stud assembly shown in FIG. 4.

FIG. 7 is a top view of the example ball stud assembly 16 shown in FIG. 5. As shown, the bearings 40 extend from the stud portion 36. In this embodiment, the bearings 40 may be retracted by actuating the release button 34, which would allow insertion of the ball stud assembly 16 into the sleeve 24; likewise, the bearings 40 may be retracted to release the ball stud assembly 16 from the sleeve 24.

Figure 8:
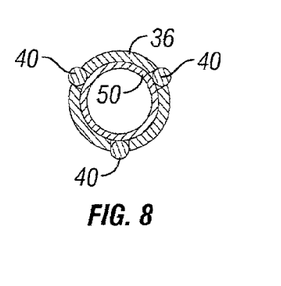
FIG. 8 is a cross-sectional view of the example ball stud assembly of FIG. 6 along line 8-8.

FIG. 8 is a cross-sectional view of the example ball stud assembly 16 along line 8-8 of FIG. 6. In this example, there are three bearings 40 circumferentially spaced apart by approximately 120 degrees. However, one skilled in the art should appreciate that more or less bearings 40 could be used depending on the application. Additionally, the spacing or arrangement of the bearings 40 could differ depending on the application.

Figure 9:
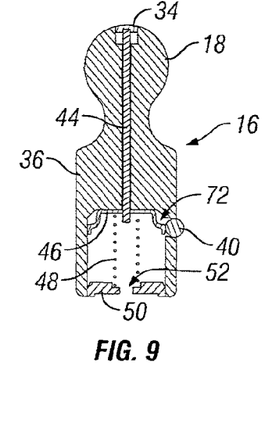
FIG. 9 is a cross-sectional view of the example ball stud assembly of FIG. 6 along line 9-9.
Figure 10:
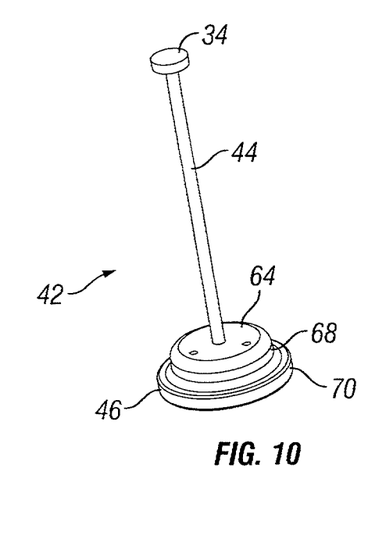
FIG. 10 is a perspective view of an example release assembly according to an embodiment of the present invention.
Figure 11:
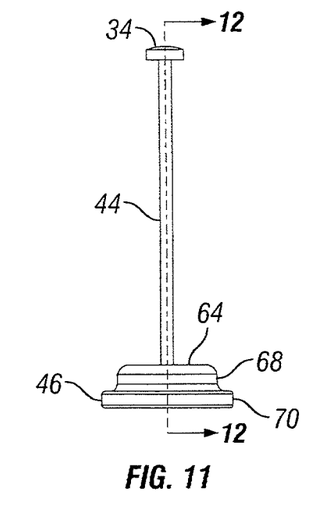
FIG. 11 is a side view of the example release assembly shown in FIG. 10.
Figure 12:
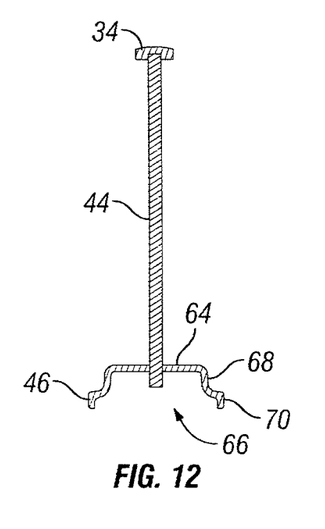
FIG. 12 is a cross-sectional view of the example release assembly of FIG. 11 along line 12-12.

FIG. 9 is a cross-sectional view of the example ball stud assembly 16 along line 9-9 of FIG. 6. In this view, it can be seen that the profile of the plunger 46 can be used to extend or retract the bearings 40. FIGS. 10-12 show additional views of the example plunger 46 shown in FIG. 9. In this embodiment, the plunger has a bell-like shape with a closed top portion 64 and an open bottom portion 66 (FIG. 12). A collar portion 68 with an arcuate cross-section extends to a rim portion 70. The profile of the collar portion 68 and rim portion 70 are configured to extend and retract bearings 40. For example, the arcuate shape of the collar portion 68 is configured in this embodiment to receive bearings 40 in a pocket 72 (FIG. 9) in a retracted position while the rim portion 68 extends the bearings 40 outward to engage the interior surface of the sleeve 24.

In this embodiment, the biasing member 48 urges the plunger 46 upward until the top portion 64 of the plunger 46 contacts the interior surface of the stud portion 36. The rod is dimensioned so the top surface of the release button 34 forms a generally continuous and uninterrupted surface with the exterior surface of the ball portion 18 when the top portion 64 of the plunger 46 contacts the interior surface of the stud portion 36. When the user actuates the release button 34, this overcomes the force of the biasing member 48 and allows the bearings 40 to enter the void between the exterior surface of the stud portion 36 and the collar portion 68, which allows the bearings 40 to move to a recessed position. When the release button 34 is released by the user, the biasing member 48 urges the top portion 64 of the plunger against the interior surface of stud portion 36. This causes the profile of the collar portion 68 and the rim portion 70 to move the bearings 40 outward to an extended position.

Figure 13:
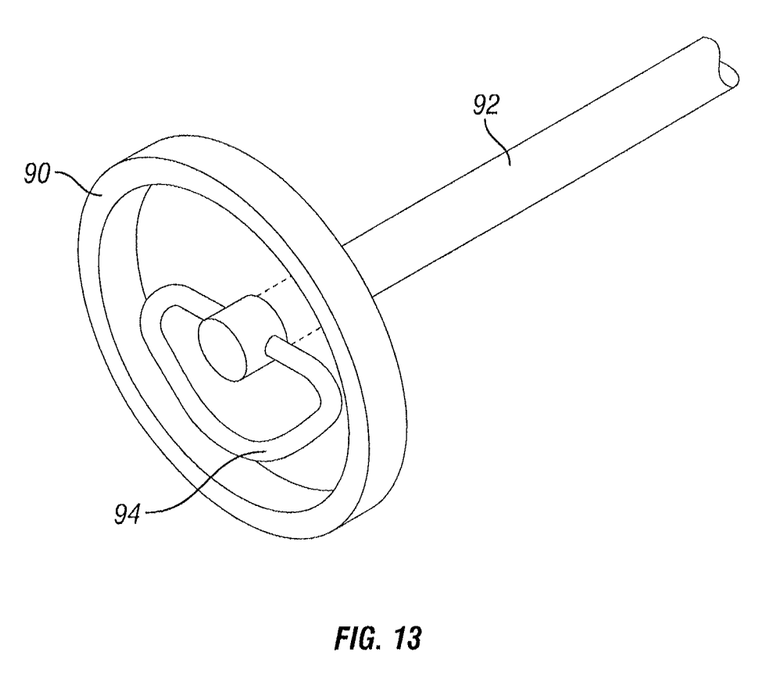
FIG. 13 is a front perspective view of a cover that could be used.

FIG. 13 shows an example top perspective view of an example cover 90 that could be used to prevent debris from entering the ball stud assembly 16 when the ball stud assembly 16 is placed in the sleeve 24 in an inverted position. In this example, the cover 90 includes a release handle 94 that may be used to pull the rod 92 against the force of the biasing member 48.

Figure 14:
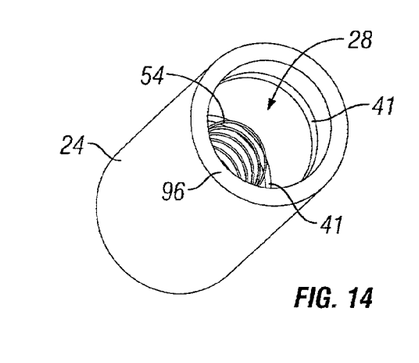
FIG. 14 is a perspective view of an example sleeve according to an embodiment of the invention.
Figure 15:
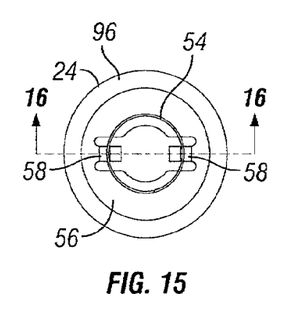
FIG. 15 is a top view of the example sleeve shown in FIG. 14.

FIG. 14 is a perspective view of the sleeve 24 according to the embodiment shown in FIG. 3. In the embodiment shown, the sleeve 24 includes a cylindrical wall 96 that defines an opening 28 into which the ball stud assembly 16 is received. As shown, the interior surface of the wall 96 includes circumferential slots 41 that are dimensioned to receive bearings 40 of the ball stud assembly 16. As discussed above, the bearings 40 are movable into and out of registry with the slots 41 to lock and unlock the ball stud assembly 16 with respect to the sleeve 24. The biasing member 54 urges the ball stud assembly 16 out of the sleeve 24. FIG. 15 is a top view of the example sleeve 24.

Figure 16:
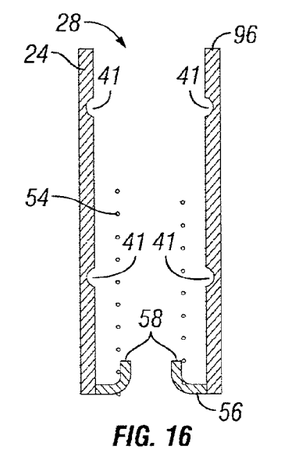
FIG. 16 is a cross-sectional view of the example sleeve of FIG. 15 along line 16-16.

FIG. 16 is a side cross-sectional view of the sleeve 24 along line 16-16 of FIG. 16. In the embodiment shown, the wall 96 defines two circumferential slots 41 to receive the bearings 40. The slots 41 are spaced so that the ball stud assembly 16 can be locked to the sleeve 24 in two positions. In this embodiment, an upper slot 41 may be used to lock the ball stud assembly 16 in an extended position with the ball portion 18 above the truck bed 12. A lower slot 41 may be used to lock the ball stud assembly 16 in a retracted position below the truck bed 12. One skilled in the art should appreciate that a single slot or more than two slots could be provided depending on the particular application. In this example, the base plate 56 includes prongs 58 that are configured to receive the biasing member 54. Embodiments are contemplated in which the base plate could include one or more drain holes.

Figure 17:
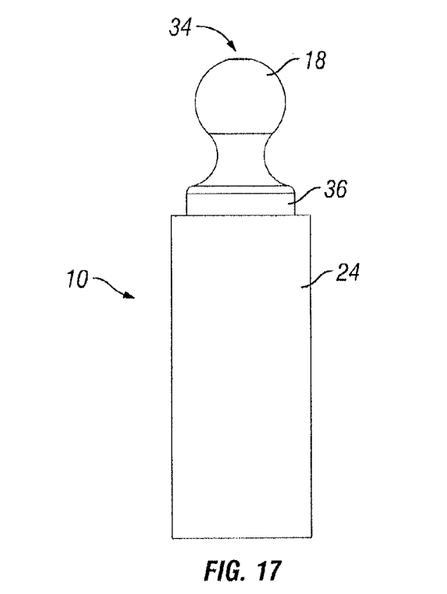
FIG. 17 is a side view of an example hitch assembly in the extended position according to an embodiment of the invention.

FIG. 17 is a side view of the hitch assembly 10 with the ball stud assembly 10 in the extended position. In this position, the ball portion 18 would be extended above the truck bed 12 for towing. The ball stud assembly 16 is locked with respect to the sleeve 24 due to the interaction between the bearings 40 and at least one of the slots 41. In the embodiment shown, the user may actuate the release button 34 (FIGS. 18-19) to release the ball stud assembly 16 from the sleeve 24.

Figure 18:
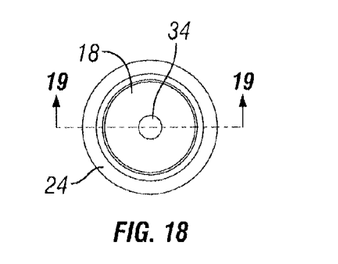
FIG. 18 is a top view of the example hitch assembly shown in FIG. 18.
Figure 19:
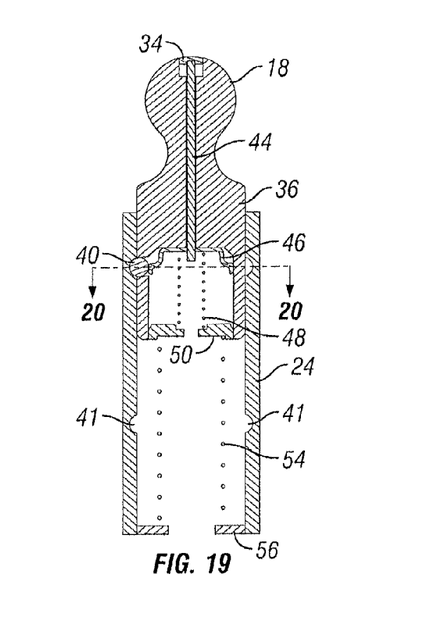
FIG. 19 is a cross-sectional view of the example hitch assembly shown in FIG. 19 along line 19-19.
Figure 20:
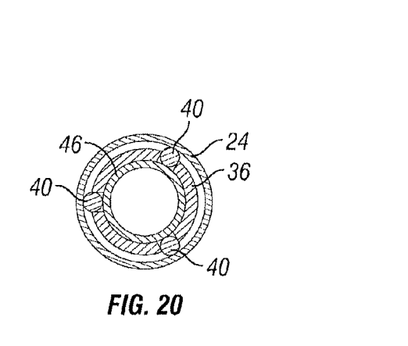
FIG. 20 is a cross-sectional view of the example hitch assembly shown in FIG. 20 along line 20-20.

FIG. 19 is a side cross-sectional view of the hitch assembly 10 along line 19-19 of FIG. 18 with the ball stud assembly 16 in the extended position. As shown, the bearings 40 are in registry with the interior slots 41 of the sleeve 24, which locks together the ball stud assembly 16 and sleeve 24. In the embodiment shown, the biasing member 48 urges the plunger 46 against the interior surface of the stud portion 36. The side profile of the plunger 46 in this embodiment moves the bearings 40 outward into the upper slot 41 in the extended position. When the user would like to release the ball stud assembly 16 from the sleeve, the user would actuate the release button 34 (e.g., push down the release button in the embodiment shown) to disengage the bearings 40 from the upper slot 41.

Figure 21:
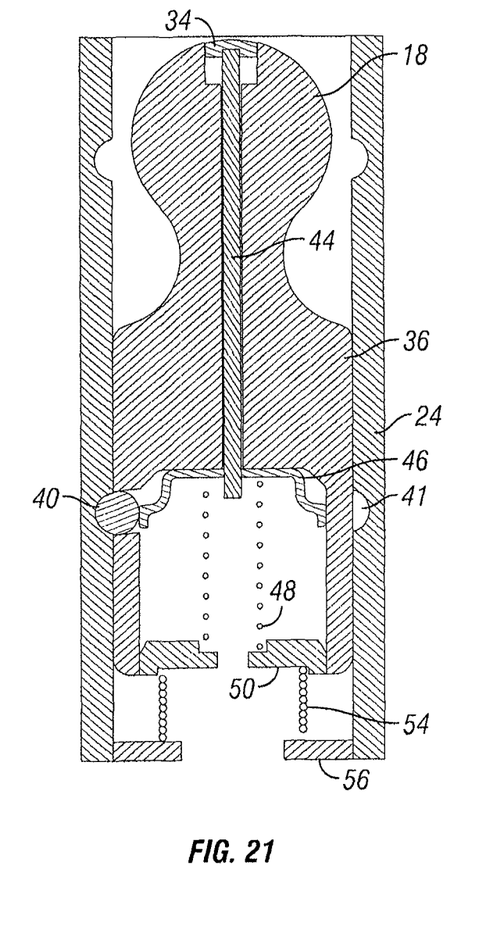
FIG. 21 is a side cross-sectional view of the example hitch assembly shown in FIG. 20 in a retracted position.

The user could move the ball stud assembly 16 to the retracted position by lowering the ball stud assembly 16 fully into the sleeve 24, such as shown in FIG. 21. When the user lets go of the release button 34, the force of the biasing member 48 will urge the plunger 46 against the interior surface of the stud portion 36. The side profile of the plunger 46 moves the bearings 40 outward into registry with the lower slot 41 of the sleeve 24. When the user would like to move the ball stud assembly 16 to the extended position, the user would actuate the release button 34. The biasing member 54 in the sleeve 24 will urge the ball stud assembly 16 out of the sleeve.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A hitch assembly comprising:
    a ball stud assembly comprising a stud portion extending from a ball portion, wherein the ball stud assembly includes a locking assembly;
    a sleeve with an open end dimensioned to receive the ball stud assembly;
    wherein the ball stud assembly is movable between an extended position in which the ball portion extends out of the sleeve and a retracted position in which the ball portion is fully received within the sleeve; and
    wherein the locking assembly is configured to selectively lock the ball stud assembly with respect to the sleeve in either the extended position or the retracted position; and
    wherein the sleeve includes a first interior groove and a second interior groove, wherein the locking assembly engages the first interior groove to lock the ball stud assembly in the extended position and engages the second interior groove to lock the ball stud assembly in the retracted position.

2. The hitch assembly as recited in claim 1, wherein the locking assembly includes one or more bearings movable between an unlocked position within the stud portion and a locked position extending through one or more openings defined in the stud portion.

3. The hitch assembly as recited in claim 2, wherein the bearings extend into the first interior groove when the ball stud assembly is locked in the extended position.

4. The hitch assembly as recited in claim 3, wherein the bearings extend into the second interior groove when the ball stud assembly is locked in the retracted position.

5. The hitch assembly as recited in claim 1, wherein the locking assembly includes a release assembly configured to release the ball stud assembly with respect to the sleeve.

6. The hitch assembly as recited in claim 5, wherein the release assembly includes an elongated rod extending through at least a portion of the ball stud assembly.

7. The hitch assembly as recited in claim 6, wherein the elongated rod has a first end with a release button and a second end with a plunger.

8. The hitch assembly as recited in claim 7, wherein the plunger includes a collar portion with an arcuate cross-section.

9. The hitch assembly as recited in claim 8, wherein the collar portion has a profile configured to receive the bearings in the unlocked position.

10. The hitch assembly as recited in claim 9, wherein the collar portion terminates at a rim portion.

11. The hitch assembly as recited in claim 10, wherein the rim portion is configured to extend the bearings to the locked position.

12. The hitch assembly as recited in claim 11, wherein the plunger is urged toward the ball portion by a biasing member.

13. The hitch assembly as recited in claim 7, wherein the release button extends through an opening defined in the ball portion of the ball stud assembly.

14. The hitch assembly as recited in claim 13, wherein the release button includes a surface that forms a generally continuous and uninterrupted surface with an exterior surface of the ball portion.

15. A hitch assembly comprising:
    a ball stud assembly including a stud portion extending from a ball portion;
    a sleeve with an open end dimensioned to receive the ball stud assembly;
    wherein the ball stud assembly is movable between an extended position in which the ball portion extends out of the sleeve and a retracted position in which the ball portion is fully received within the sleeve; and
    wherein the ball stud assembly includes a locking assembly that is movable to a locked position in which the ball stud assembly is locked with respect to the sleeve and an unlocked position in which the ball stud assembly is freely movable with respect to the sleeve,
    wherein the locking assembly is actuated by a release button that extends from the ball portion to move the locking assembly between the locked and unlocked positions.

16. The hitch assembly as recited in claim 15, wherein the release button extends through an opening defined in the ball portion of the ball stud assembly.

17. The hitch assembly as recited in claim 16, wherein the release button includes a surface that forms a generally continuous and uninterrupted surface with an exterior surface of the ball portion.

18. The hitch assembly as recited in claim 17, wherein the sleeve has a generally cylindrical shape with an interior surface defining a first circumferential slot and a second circumferential slot.

19. The hitch assembly as recited in claim 18, wherein the stud portion has a generally cylindrical shape defining one or more openings through which one or more respective bearings of the locking assembly are movable therethrough into registry with either the first circumferential slot or the second circumferential slot.

* * * * *